United States Patent
Tsuda et al.

(10) Patent No.: US 10,198,301 B2
(45) Date of Patent: *Feb. 5, 2019

(54) SEMICONDUCTOR DEVICE

(71) Applicant: Renesas Electronics Corporation, Tokyo (JP)

(72) Inventors: Tetsuji Tsuda, Kodaira (JP); Masaru Hase, Kodaira (JP); Yuki Inoue, Kodaira (JP); Naohiro Nishikawa, Kodaira (JP)

(73) Assignee: RENESAS ELECTRONICS CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/100,260

(22) Filed: Aug. 10, 2018

(65) Prior Publication Data

US 2018/0349208 A1 Dec. 6, 2018

Related U.S. Application Data

(63) Continuation of application No. 15/173,634, filed on Jun. 4, 2016, now Pat. No. 10,067,806.

(30) Foreign Application Priority Data

Aug. 11, 2015 (JP) .................... 2015-158722

(51) Int. Cl.
G06F 3/06 (2006.01)
G06F 9/52 (2006.01)
G06F 9/48 (2006.01)

(52) U.S. Cl.
CPC ............. *G06F 9/52* (2013.01); *G06F 9/4812* (2013.01)

(58) Field of Classification Search
USPC ......................................... 711/109
See application file for complete search history.

(56) References Cited

U.S. PATENT DOCUMENTS

| | | | | |
|---|---|---|---|---|
| 5,555,395 A * | 9/1996 | Parks | ................. | G06F 12/1027 711/145 |
| 6,101,584 A * | 8/2000 | Satou | ................. | G06F 13/1652 710/108 |
| 7,613,886 B2 * | 11/2009 | Yamazaki | ............. | G06F 15/167 365/189.04 |
| 8,788,738 B2 | 7/2014 | Riho | | |
| 2004/0153622 A1 * | 8/2004 | Asakawa | ............. | G06F 9/3802 711/214 |

(Continued)

*Primary Examiner* — Mano Padmanabhan
*Assistant Examiner* — Jean C Edouard
(74) *Attorney, Agent, or Firm* — McGinn IP Law Group, PLLC

(57) ABSTRACT

A semiconductor device includes a central processing unit and a processor on one semiconductor substrate. The processor includes a buffer for storing a first register setting list and notifies the central processing unit of an access complete signal indicating completion of reading a second register setting list within a memory. The central processing unit changes the second register setting list within the memory based on the access complete signal and notifies the processor of an update request signal. The processor reads the second register setting list changed by the central processing unit into the buffer to update the first register setting list based on the update request information.

12 Claims, 13 Drawing Sheets

(56) References Cited

U.S. PATENT DOCUMENTS

| | | | |
|---|---|---|---|
| 2007/0050541 A1* | 3/2007 | Carr | G06F 12/0866 |
| | | | 711/113 |
| 2007/0174373 A1 | 7/2007 | Morita | |
| 2007/0296620 A1* | 12/2007 | Honda | G06F 13/28 |
| | | | 341/155 |
| 2008/0235290 A1 | 9/2008 | Nagasawa | |
| 2010/0309511 A1* | 12/2010 | Ito | H04N 1/00965 |
| | | | 358/1.15 |
| 2010/0329137 A1 | 12/2010 | Yamada | |
| 2011/0185126 A1* | 7/2011 | Sasaki | G06F 12/0837 |
| | | | 711/124 |
| 2011/0246728 A1* | 10/2011 | Maruyama | G06F 12/10 |
| | | | 711/154 |
| 2011/0289279 A1* | 11/2011 | Sonnier | G06F 12/0804 |
| | | | 711/144 |
| 2011/0296256 A1* | 12/2011 | Watkins | G06F 11/0745 |
| | | | 714/54 |
| 2011/0309511 A1 | 12/2011 | Cho et al. | |
| 2011/0320660 A1 | 12/2011 | Hara | |
| 2012/0105679 A1 | 5/2012 | Osuga | |
| 2013/0191617 A1 | 7/2013 | Ishikawa | |
| 2014/0006647 A1 | 1/2014 | Sugasawa | |
| 2014/0129800 A1* | 5/2014 | Deutschle | G06F 12/1027 |
| | | | 711/207 |

\* cited by examiner

SEMICONDUCTOR DEVICE

This Application is a Continuation Application of U.S. patent application Ser. No. 15/173,634 filed on Jun. 4, 2016, now U.S. Pat. No. 10,067,806.

CROSS-REFERENCE TO RELATED APPLICATIONS

The disclosure of Japanese Patent Application No. 2015-158722 filed on Aug. 11, 2015 including the specification, drawings and abstract is incorporated herein by reference in its entirety.

BACKGROUND

This disclosure relates to a semiconductor device and it can be applied to a semiconductor device, for example, provided with hardware Intellectual Property (IP) of operating based on a register setting list.

A function block forming a Central Processing Unit (CPU) and a memory, and a Large-Scale Integration (LSI) such as a signal processing circuit is called "IP" (Intellectual Property) in a semiconductor field. The IP includes hardware (logical circuit diagram, LSI layout, etc.) and software (driver software, firmware, middleware, etc.) of each function block. Further, a System-on-a-Chip (SoC) is a method of mounting all the functions necessary for the operation of some device or system on one semiconductor chip, including hardware IP (hereinafter, referred to as H/W_IP) of various kinds of controllers and memories with the CPU fixed as the core. The prior technique related to this disclosure includes, for example, US Patent Application Publication No. 2010/0309511.

According to an increase in the number of H/W_IP mounted on a SoC and an increase in the frequency of interruption from each H/W_IP, the interruption processing time by a CPU has an increasing tendency. Further, a restriction on the control timing of H/W_IP by a CPU is getting severer with the faster rate.

Other objects and novel characteristics will be apparent from the description and the invention and the attached drawings.

SUMMARY

The outline of the typical one of this disclosure will be briefly described as follows. That is, CPU and H/W_IP share a register setting list at a time sharing and while the H/W_IP does not refer to the register setting list, the CPU can rewrite the register setting list.

According to the above, it is possible to reduce a restriction on the control timing of the H/W_IP by the CPU.

DETAILED DESCRIPTION

Hereinafter, embodiments will be described by using the drawings. In the following description, the same codes are attached to the same components and the repeated description thereof may be omitted.

At first, a technology examined by the inventor et al. prior to this disclosure (hereinafter, referred to as a comparison example) will be described.

Figure 1:
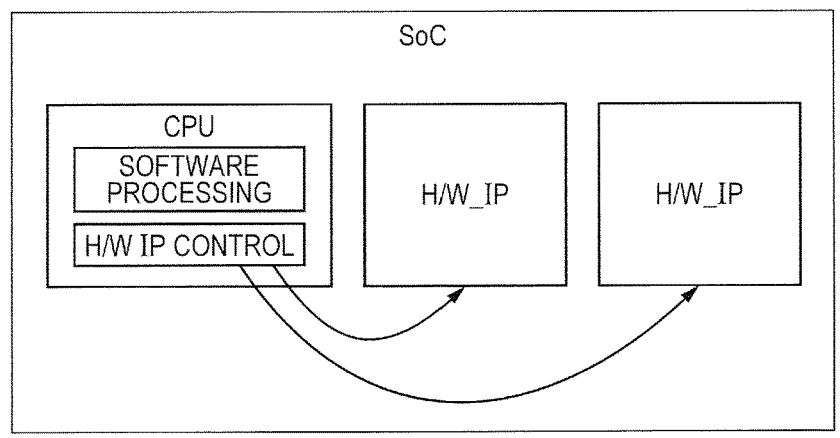
FIG. 1 is a block diagram for use in describing a SoC.

FIG. 1 is a block diagram for use in describing a SoC. The SoC includes H/W_IP in addition to a central processing unit (CPU); therefore, the CPU needs to control not only the software processing but also the H/W_IP. The software processing includes usual processing and priority processing. The usual processing corresponds to processes in an Operating System (OS) and thread processing. While the priority processing is an interruption processing. For example, in the SoC for processing video and sound, the usual processing time has an increasing tendency together with the higher quality of image and sound. The priority processing time has an increasing tendency according to an increase in the number of the H/W_IP mounted on the SoC and an increase in the frequency of interruption from each H/W_IP. Further, restriction of the control timing of the H/W_IP gets severer with the faster rate. For example, in the case of video of 60 fps (frame per second), one frame is 16.6 ms (=1 sec/60 frame).

Comparison Example 1

As shown by dashed arrows RS, a H/W_IP 12A reads out the register setting list from a memory 20A in a buffer 1221A within a control circuit 122A through a memory interface 124A, a bus 15A and a memory controller 16A. This is the H/W_IP control 122A.

Figure 2:
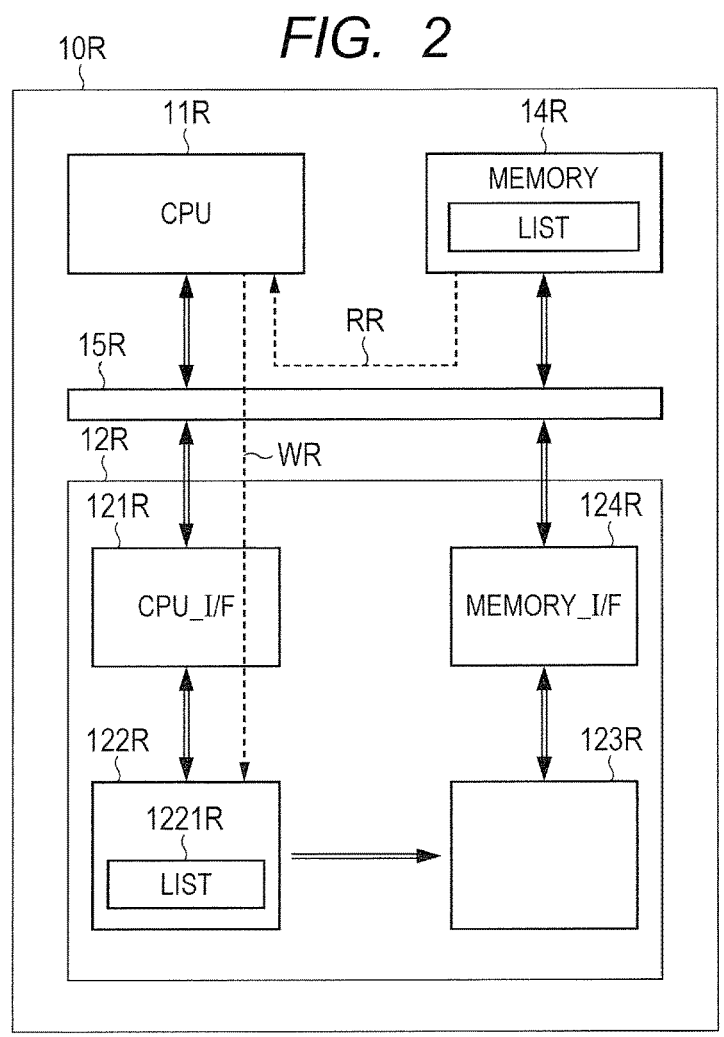
FIG. 2 is a block diagram for use in describing the structure of a SoC according to a comparison example 1.

FIG. 2 is a block diagram showing the structure of a SoC according to a comparison example 1. The SoC 10R according to the comparison example 1 includes a CPU 11R, an H/W_IP 12R, a memory (MEMORY) 14R, and a bus 15R. The H/W_IP 12R includes a CPU interface (CPU_I/F) 121R, a control circuit 122R, a processing circuit 123R, and a memory interface (MEMORY_I/F) 124R. As shown by dashed arrows RR and WR, the CPU 11R reads out a register setting list from the memory 14R through the bus 15R and writes the register setting list in a buffer 1221R within the control circuit 122R of the H/W_IP 12R. This is the H/W_IP control 122R. The processing circuit 123R processes data according to the register setting list within the buffer 1221R and sends and receives data between the memory 14R and itself through the memory interface 124R and the bus 15R.

Figure 3:
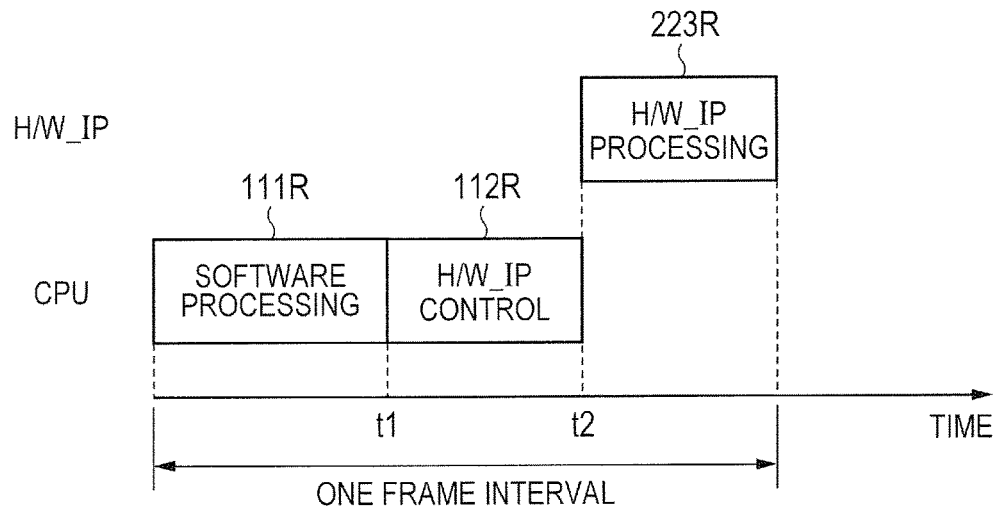
FIG. 3 is a view for use in describing a control timing in the SoC of FIG. 2.

FIG. 3 is a view showing a control timing of the SoC in the comparison example 1. During one frame, the CPU 11R performs the processing (software processing) 111R by the software from the start of one frame to t1 and the processing (H/W_IP control) 112R for controlling the H/W_IP 12R from t1 to t2, and the H/W_IP 12R performs the processing (H/W_IP processing) 223R based on the H/W_IP control from t2 to the end of one frame.

Figure 4:
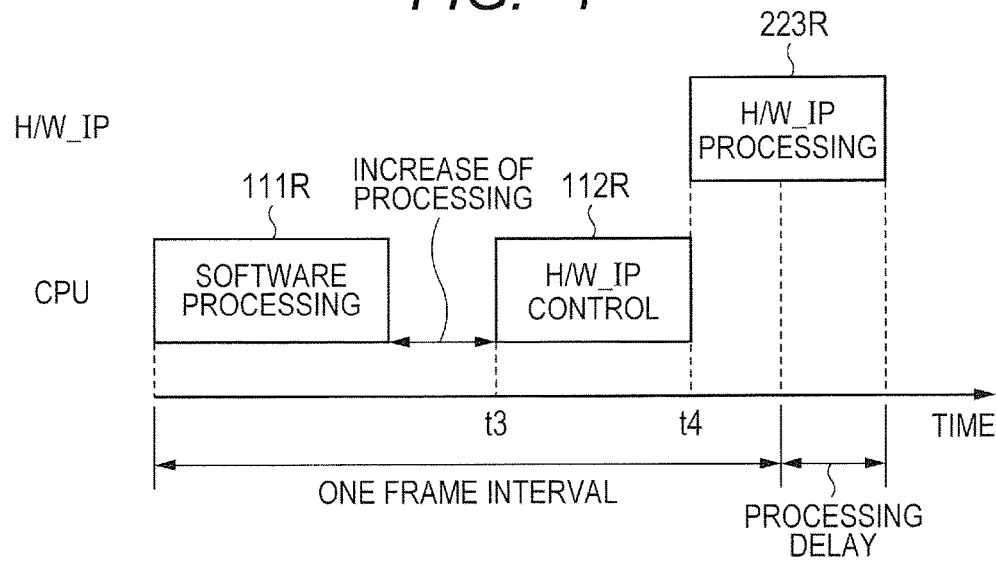
FIG. 4 is a view for use in describing a problem caused by a delay of the control timing in the SoC of FIG. 2.

FIG. 4 is a view showing a problem caused by a delay of the control timing in the SoC according to the comparison example 1. When the processing time of the software processing 111R increases and the starting timing (t3) of the H/W_IP control 112R is delayed (t3>t1), the starting timing (t4) of the H/W_IP processing is delayed (t4>t2) and the H/W_IP processing 223R is not finished until the end of one frame, thereby causing a problem. For example, when the starting timing (t3) of the H/W_IP control 112R is delayed in the SoC for processing video and sound, the video and the sound are disturbed.

As the solving method of the above problem, a reduction of the software processing time can be considered; however, software size is magnified and the software size other than the development of a semiconductor device maker, such as a customer development section for a user of OS or Soc is enlarged. Therefore, it is difficult to put a restrict on the increasing processing time and this is not a practical solving method. The result from examining the solving method of the problem, other than the reduction of the software processing time, will be described as follows.

Comparison Example 2

Figure 5:
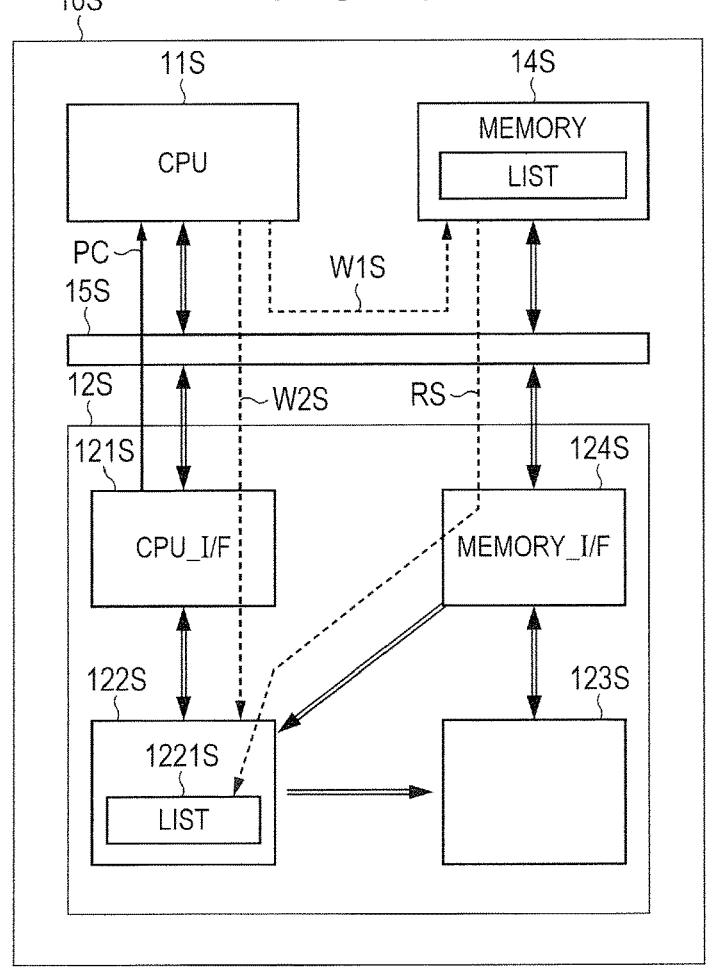
FIG. 5 is a block diagram for use in describing the structure of a SoC according to a comparison example 2.
Figure 6:
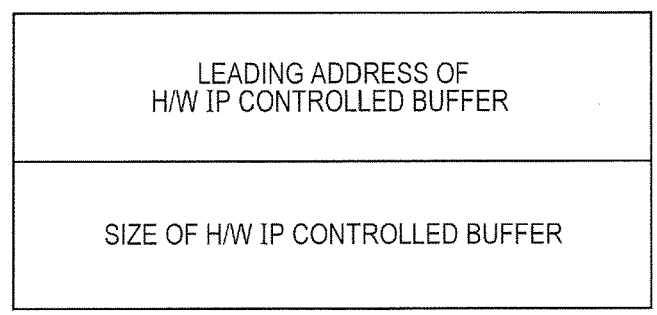
FIG. 6 is a view for use in describing access information of a register setting list in the SoC of FIG. 5.

FIG. 5 is a block diagram showing the structure of a SoC according to a comparison example 2. FIG. 6 is a view showing access information of a register setting list in the SoC according to the comparison example 2.

The H/W_IP of the SoC according to the comparison example 2 is not controlled by the CPU but is to control itself. The SoC 10S according to the comparison example 2 includes a CPU 11S, an H/W_IP 12S, a memory (MEMORY) 14S such as a Static Random Access Memory (SRAM), and a bus 15S. The H/W_IP 12S includes a CPU interface (CPU_I/F) 121S, a control circuit 122S, a processing circuit 123S, and a memory interface (MEMORY_I/F) 124S. As shown by a dashed arrow W1S, the CPU 11S writes a register setting list into the memory 14S through the bus 15S. As shown by a dashed arrow W2S, the CPU 11S writes the access information of the register setting list within the memory 14S into a buffer 1221S of the H/W_IP 12S through the bus 15S. As shown in FIG. 6, the access information includes a leading address of an H/W_IP controlled buffer (register setting list) and a size of the H/W_IP controlled buffer (register setting list). As shown by a dashed arrow RS, the H/W_IP 12S reads the register setting list from the memory 14S through the memory interface 124S and the bus 15S, into the buffer 1221S. This is the H/W_IP control 222S. The control circuit 122S controls the H/W_IP 12S according to the register setting list within the buffer 1221S. The processing circuit 123S processes data according to the register setting list within the buffer 1221S and for example, calculates data within the memory 14S read by the memory interface 124S through the bus 15S. The memory interface 124S writes the calculated data into the memory 14S through the bus 15S. The contents of the register setting list depends on the processing; for example, when performing image magnification in the image processing, the contents of the register setting list include: address and size of an input image; address and size of an output image; magnification factor; interpolation method at the magnification time.

Figure 7:
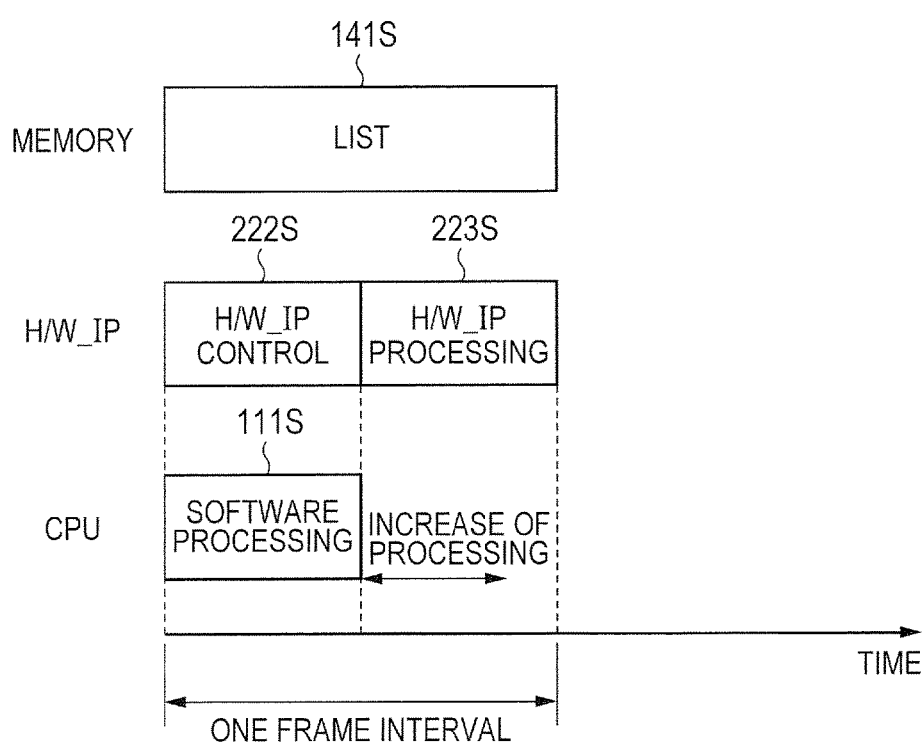
FIG. 7 is a view for use in describing a control timing in the SoC of FIG. 5.

FIG. 7 is a view showing a control timing in the SoC according to the comparison example 2. In the comparison example 2, the H/W_IP 12S refers to the register setting list 141S previously created by the CPU 11S in the memory 14S in order that the H/W_IP 12S controls itself. According to this, the H/W_IP control 222S can be started at a predetermined timing without necessity of the H/W_IP control by the CPU 11S, not depending on the timing of the software processing 111S and the increasing processing time by the CPU 11S. However, a register setting list has to be created previously by the CPU 11S; therefore, the H/W_IP 12S is based on premise that the predetermined processing is repeated.

Figure 8:
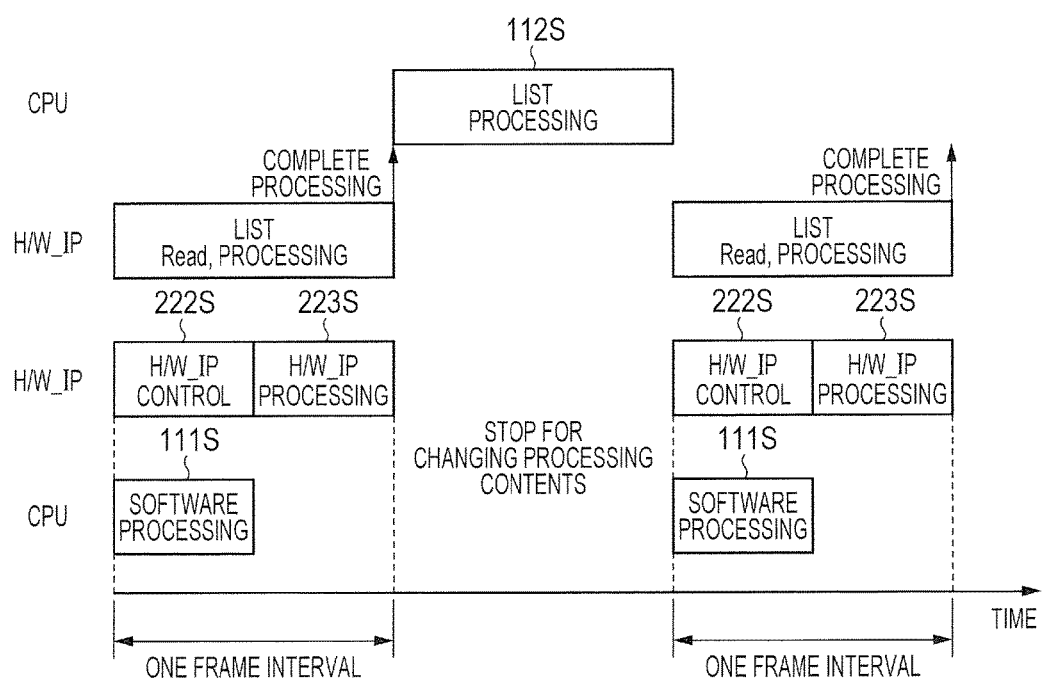
FIG. 8 is a view for use in describing a control timing for changing a register setting list in the SoC of FIG. 5.

FIG. 8 is a view showing a control timing for changing the register setting list in the SoC according to the comparison example 2. The H/W_IP 12S reads the register setting list from the memory 14S during one frame and performs the corresponding processing. In order not to rewrite the register setting list before finishing the access to the register setting list by the H/W_IP 12S, the CPU 11S changes the register setting list and writes it into the memory 14S after receiving the processing complete signal (PC) indicating the completion of the processing. Therefore, the register setting list cannot be changed within a period of one frame but the processing of the H/W_IP 12S cannot be performed in series. Accordingly, when changing the register setting list of the H/W_IP 12S on the way of the processing, the processing of the H/W_IP 12S should be stopped temporarily. According to this, for example, video and sound are disturbed when changing the reproduction contents of the video and the sound (video size and sound frequency).

EMBODIMENT

The CPU and the H/W_IP are designed to share a register setting list at time sharing. While the H/W_IP does not refer to the register setting list, the CPU is enabled to rewrite the register setting list. According to this, while the H/W_IP continues the processing, the CPU is enabled to change the contents of the H/W_IP processing, hence to reduce the restriction on a control timing of the H/W_IP by the CPU. For example, at a time of changing the reproduction contents of the H/W_IP for video processing and the H/W_IP for sound processing, the CPU can change the contents of the H/W_IP processing without generating disturbance of the video and the sound.

First Embodiment

Figure 9:
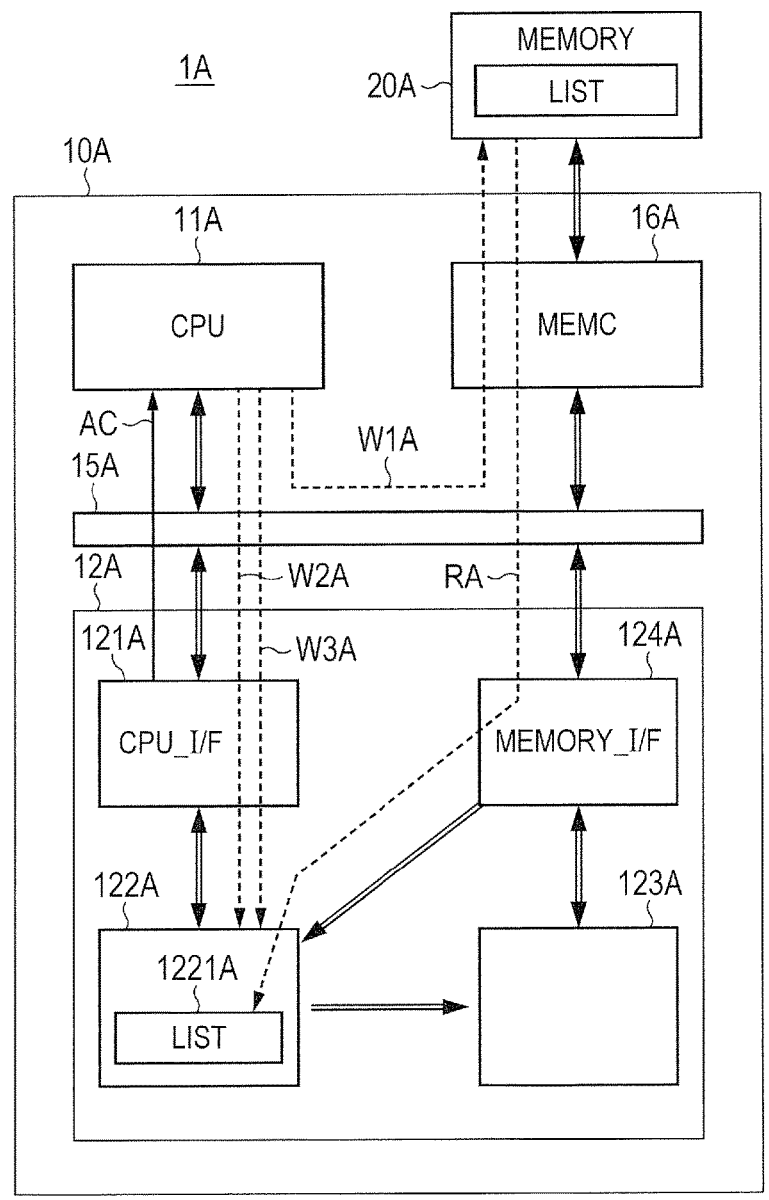
FIG. 9 is a block diagram for use in describing the structure of a system according to a first embodiment.

FIG. 9 is a block diagram showing the structure of a system according to a first embodiment. The system 1A includes a SoC 10A and a memory (MEMORY) 20A such as Synchronous Dynamic Random Access Memory (SDRAM). The SoC 10A is a semiconductor device formed on one semiconductor substrate. The memory 20A is a semiconductor device formed on one semiconductor substrate. The memory 20A may be formed by a plurality of semiconductor chips. The system 1A may be a System in Package (SiP) formed by sealing the SoC 10A and the memory 20A into one package or formed by sealing them in separate packages and mounting them on one substrate. The system 1A is also referred to as a semiconductor device. Similarly to the comparison example 2, the memory 20A may be a memory such as SRAM built in the SoC 10A.

The SoC 10A includes a CPU 11A, an H/W_IP 12A, a memory controller (MEMC) 16A, and a bus 15A. The H/W_IP 12A performs predetermined processing (for example, video processing and sound processing) within a predetermined period (for example, 16.6 ms in one frame period) and the predetermined processing is periodically performed in series. The H/W_IP 12A includes a CPU interface (CPU_I/F) 121A, a control circuit 122A, a processing circuit 123A, and a memory interface (MEMORY_I/F) 124A. As shown by a dashed arrow W1A, the CPU 11A writes a register setting list in the memory 20A through the bus 15A and the memory controller 16A. As shown by a dashed arrow W2A, the CPU 11A writes access information of the register setting list within the memory 14A, similarly to the comparison example 2 (FIG. 6), in the control circuit 122A of the H/W_IP 12A through the bus 15A and the memory controller 16A. The H/W_IP 12A reads the register setting list from the memory 20A through the memory interface 124A, the bus 15A, and the memory controller 16A into a buffer 1221A of the control circuit 122A. This is the H/W_IP control 112A. The buffer 1221A may be not within the control circuit 122A but may be provided, for example, between the CPU interface 121A and the control circuit 122A. The control circuit 122A controls the H/W_IP 12A according to the register setting list within the buffer 1221A. The processing circuit 123A calculates data (for example, video data and sound data) within the memory 14A read by the memory interface 124A through the bus 15A and the memory controller 16A, according to the register setting list within the buffer 1221A. The memory interface 124A writes the calculated data in the memory 14A through the bus 15A and the memory controller 16A. The control circuit 122A generates information notifying access start (Read start) and access complete (Read complete) as for the register setting list within the memory 20A, and based on the whole or a part of the information, the CPU interface 121A can generate a signal, for example, an access complete signal (AC) and transmit the signal to the CPU 11A. The signal may be an interruption request signal not the exclusive signal such as access complete signal. The contents of the register setting list depend on the processing but the register setting list in the case of image magnification in the image processing is the same as in the comparison example 2.

Figure 10:
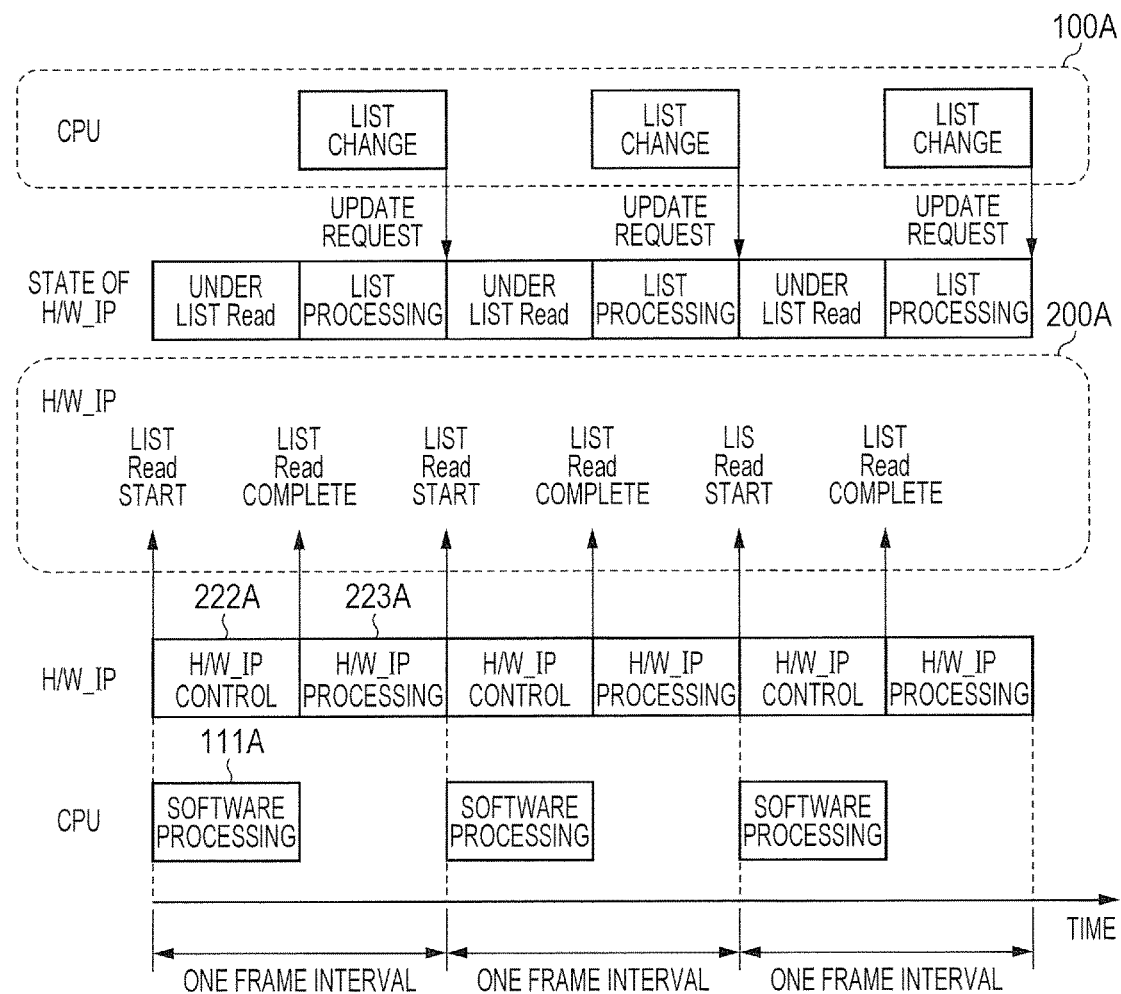
FIG. 10 is a view for use in describing a control timing in the SoC of FIG. 9.

FIG. 10 is a view showing a control timing for changing the register setting list in the SoC according to the first embodiment. The H/W_IP 12A informs the CPU 11A of the list Read start information in the former half of one frame, to read the register setting list from the memory 20A (reading the list), and informs the CPU 11A of the list Read complete information at a time of completion of reading, to perform the corresponding processing in the latter half of one frame (processing the list). After receiving the access complete signal (AC), the CPU 11A changes the register setting list within the memory 20A and as shown by a dashed arrow W3A in FIG. 9, it informs the H/W_IP 12A of the update request. The portion of a dashed line 100A is a CPU function (S/W_IP function) added to the comparison example 2 and the portion of a dashed line 200A is an H/W_IP function added to the comparison example 2.

According to the first embodiment, while continuing the processing of the H/W_IP 12A, the CPU 11A is enabled to change the processing list of the H/W_IP 12A. According to this, for example, at a time of changing the reproduction contents of video and sound, it is possible to reduce the generation of disturbance in the video and the sound. The CPU 11A, however, has to wait for a list unused period by the H/W_IP 12A (list Read complete). As the result, a period of using the CPU by the application is reduced. At every update of the list, the CPU 11A has to issue a list update request to the H/W_IP 12A. Therefore, even when the list is updated, when the CPU 11A delays to issue an update request at a high load, the list update timing by the H/W_IP 12A is delayed. As the result, for example, there may occur video disturbance and sound disturbance at a high load.

Second Embodiment

Figure 11:
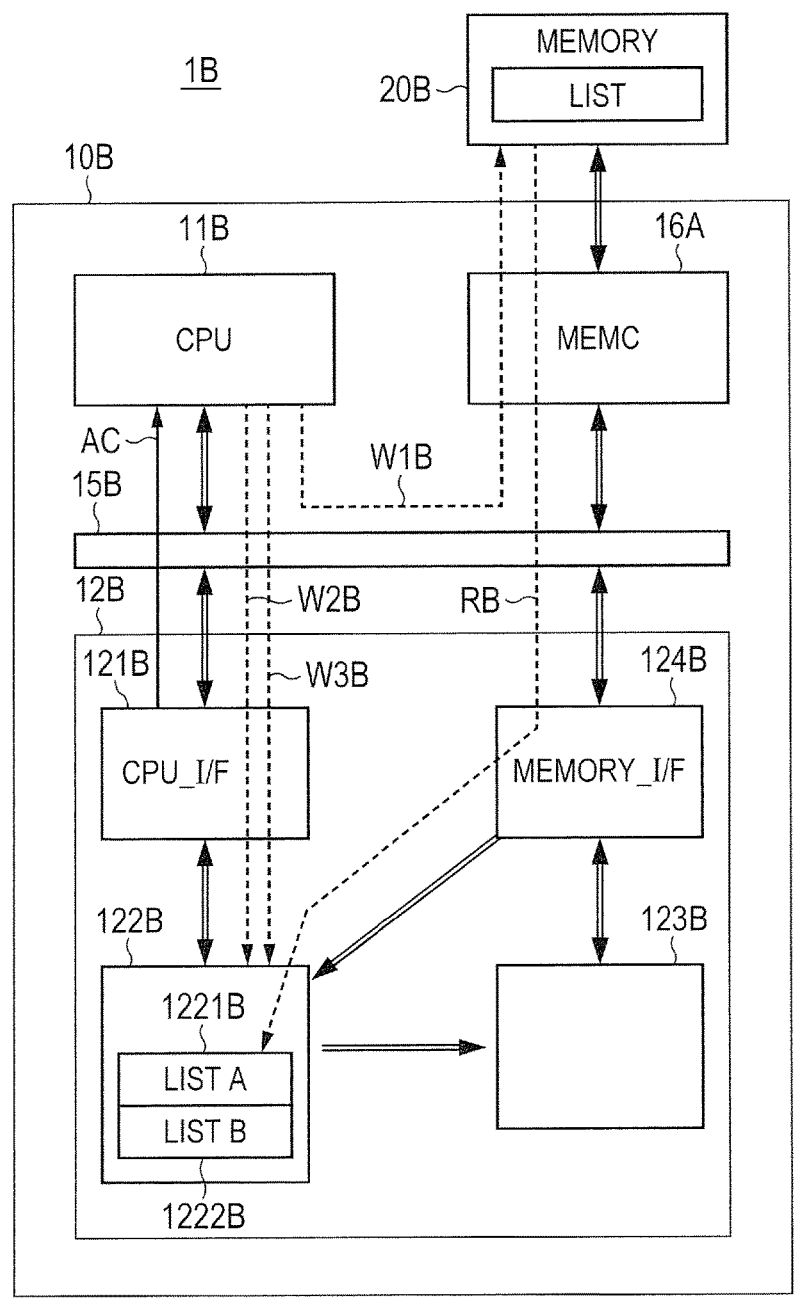
FIG. 11 is a block diagram for use in describing the structure of a system according to a second embodiment.

FIG. 11 is a block diagram showing the structure of a system according to a second embodiment. The system 1B includes a SoC 10B and a memory (MEMORY) 20B such as SDRAM. The SoC 10B is a semiconductor device formed on one semiconductor substrate. The memory 20B is a semiconductor device formed on one semiconductor substrate. The memory 20B may be formed by a plurality of semiconductor chips. The system 1B may be a SiP formed by sealing the SoC 10B and the memory 20B into one package or may be formed by sealing them into separate packages and mounting them on one substrate. The system 1B is also referred to as a semiconductor device. The memory 20B may be a memory such as SRAM built in the SoC 10B similarly to the comparison example 2.

The SoC 10B includes a CPU 11B, an H/W_IP 12, a memory controller (MEMC) 16B, and a bus 15B. The H/W_IP 12B performs predetermined processing (for example, video processing and sound processing) within a predetermined period (for example, 16.6 ms) similarly to the H/W_IP 12A and the predetermined processing is periodically performed in series. The H/W_IP 12B includes a CPU interface (CPU_I/F) 121B, a control circuit 122B, a processing circuit 123B, and a memory interface (MEMORY_I/F) 124B. As shown by a dashed arrow W1B, the CPU 11B writes a register setting list into the memory 20B through the bus 15B and the memory controller 16B. As shown by a dashed arrow W2B, the CPU 11B writes the access information of the register setting list within the memory 14B into the control circuit 122B of the H/W_IP 12B through the bus 15B and the memory controller 16B, similarly to the comparison example 2 (FIG. 6). As shown by a dashed arrow RB, the H/W_IP 12B reads the register setting list from the memory 20B through the memory interface 124B, the bus 15B, and the memory controller 16B into buffers 1221B and 1222B within the control circuit 122B. This is the H/W_IP control 112B. The buffers 1221B and 1222B may be not within the control circuit 122B but may be provided, for example, between the CPU interface 121B and the control circuit 122B. The control circuit 122B controls the H/W_IP 12B according to the register setting lists within the buffers 1221B and 1222B. The processing circuit 123B calculates the data (for example, video data and sound data) within the memory 14B read by the memory interface 124B through the bus 15B and the memory controller 16B according to the register setting lists within the buffers 1221B and 1222B. The memory interface 124B writes the calculated data into the memory 14B through the bus 15B and the memory controller 16B. The control circuit 122B generates information notifying access start (Read start) and access complete (Read complete) as for the register setting list within the memory 20B and based on the whole or a part of the information, the CPU interface 121B can generate a signal, for example, an access complete signal (AC) and transmit the above to the CPU 11B. It may be an interruption request signal not an exclusive signal such as the access complete signal. Although the contents of the register setting list depend on the processing, the register setting list in the case of the image magnification in the image processing is the same as in the comparison example 2. The H/W_IP 12B is enabled to use several types of register setting lists; therefore, it includes, for example, the buffer 1221B accommodating a list A and the buffer 1222B accommodating a list B.

Figure 12:
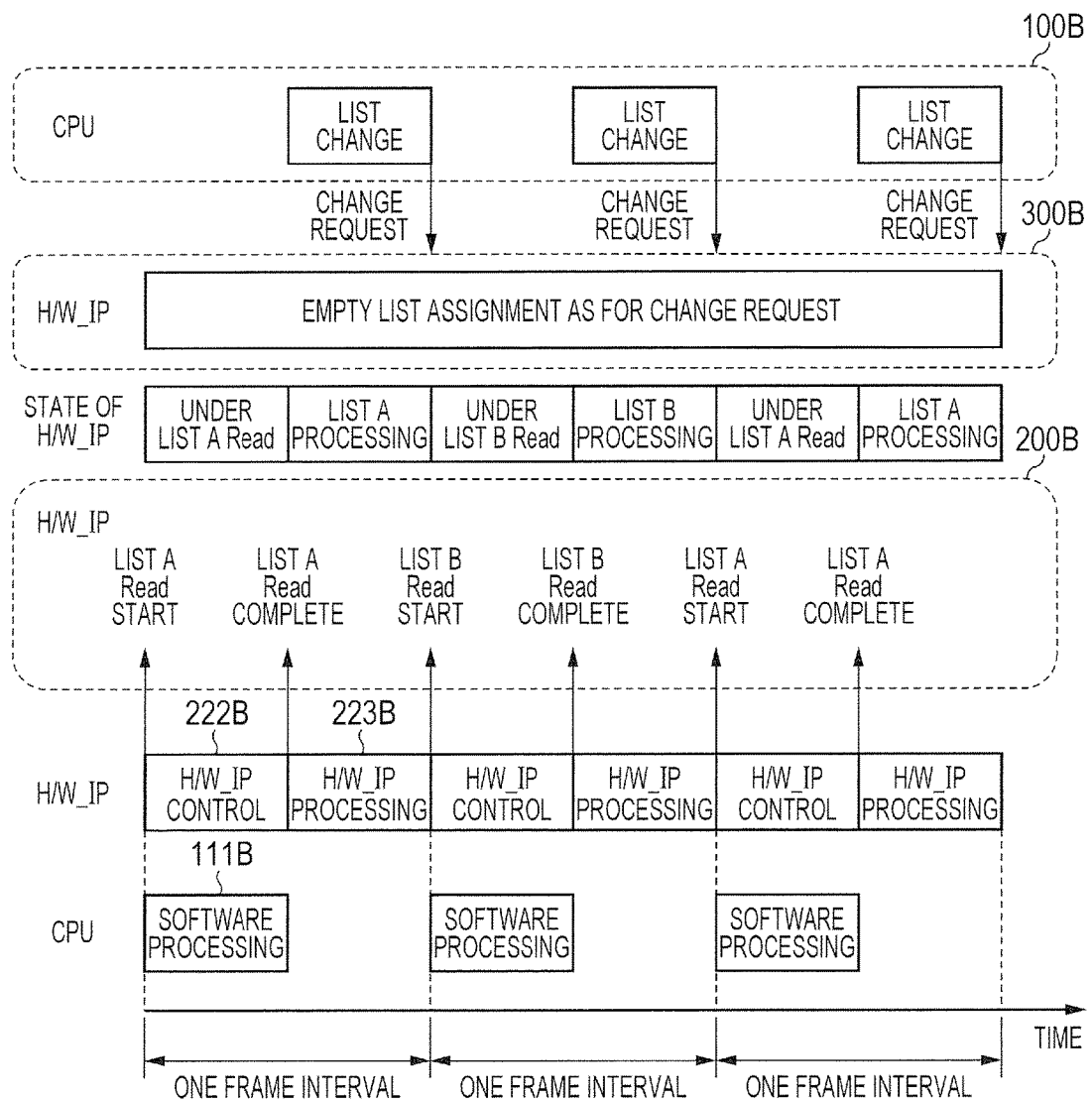
FIG. 12 is a view for use in describing a control timing in the SoC of FIG. 11.

FIG. 12 is a view showing a control timing for changing a register setting list in the SoC according to the second embodiment. The H/W_IP 12B reads the register setting list from the memory 20B (reading the list A) in the former half of one frame and performs the corresponding processing in the latter half of one frame (processing the list A). The CPU 11B changes the register setting list after receiving the access complete signal (AC). The portion of a dashed line 100B is a CPU function (S/W_IP function) added to the comparison example 2. The portion of a dashed line 200B is an H/W_IP function added to the comparison example 2, similarly to the dashed line 200A of the first embodiment. The portion of a dashed line 300B is a buffer control function added to the first embodiment. In the portion of the dashed line 100B, a change request issue to the buffer control function (empty list assignment function) is further added, in addition to the list change added to the first embodiment.

Figure 13:
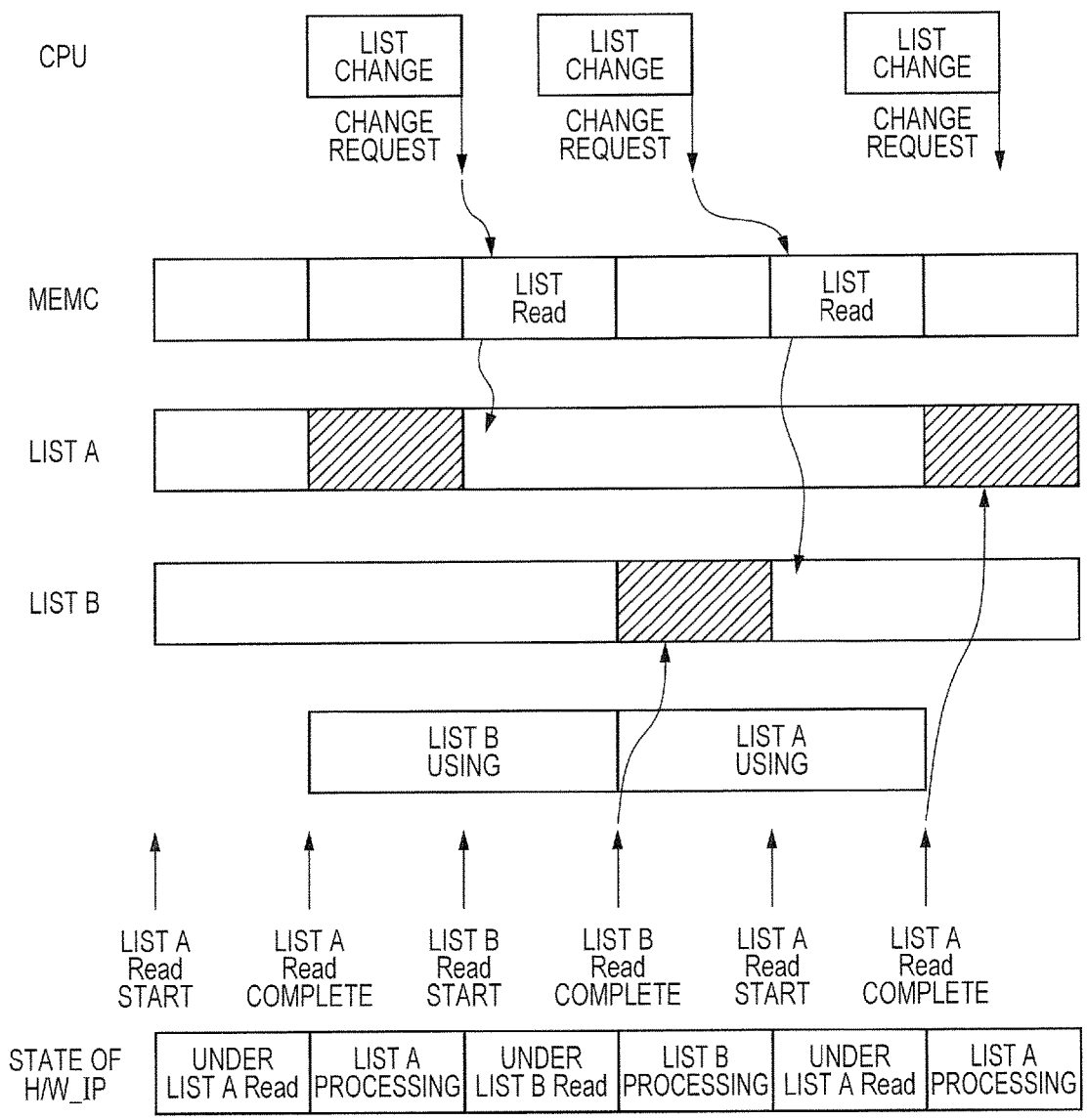
FIG. 13 is a view for use in describing a buffer control function in the SoC of FIG. 11.

FIG. 13 is a view for use in describing the buffer control function in the SoC according to the second embodiment. The empty list assignment function (buffer control function) is a function for controlling the lists, according to the information notifying Read start or Read complete in the H/W_IP 12B and the change request from the CPU 11B. For example, when the Read complete of the list A is notified, it is determined that the list B is being used until the Read complete of the list B is notified. When the change request is made by the CPU 11B, as shown by a dashed arrow W3B, in a period from the notification of the Read complete of the list A to the notification of the Read complete of the list B, the H/W_IP 12B writes the contents changed by the CPU 11B in the register setting list within the memory 20B, in the list A within the buffer 1221B and after the notification of the Read complete of the list B, it switches the register setting list for use in control of the control unit 122B from the list A to the list B. At the notification of the Read complete of the list B, it is determined that the list A is being used until the notification of the Read complete of the list A. When the change request is made by the CPU 11B in a period from the notification of the Read complete of the list B to the notification of the Read complete of the list A, the H/W_IP 12B writes the contents changed by the CPU 11B in the register setting list within the memory 20B, into the list B within the buffer 1221B and switches the register setting list for use in the control of the control unit 122B after the notification of the Read complete of the list A.

By being provided with a plurality of buffers and expanding the list number from one to plural (lists A and B), the CPU 11B can change another list while the H/W_IP 12B is referring to a list. According to this, while continuing the processing of the H/W_IP 12B, the processing contents of the H/W_IP 12B can be changed. Thus, for example, at the time of changing the reproduction contents of the video and the sound, it is possible to suppress the generation of the video disturbance and the sound disturbance. Further, thanks to the empty list assignment function, the CPU 11B does not have to wait for the list unused period by the H/W_IP 12B.

As the result, it is possible to improve the reduction of the period of using application by the CPU 11A according to the first embodiment. However, it is not possible to resolve a problem that a list change request has to be issued to the H/W_IP 12B at every time of changing list.

Third Embodiment

Figure 14:
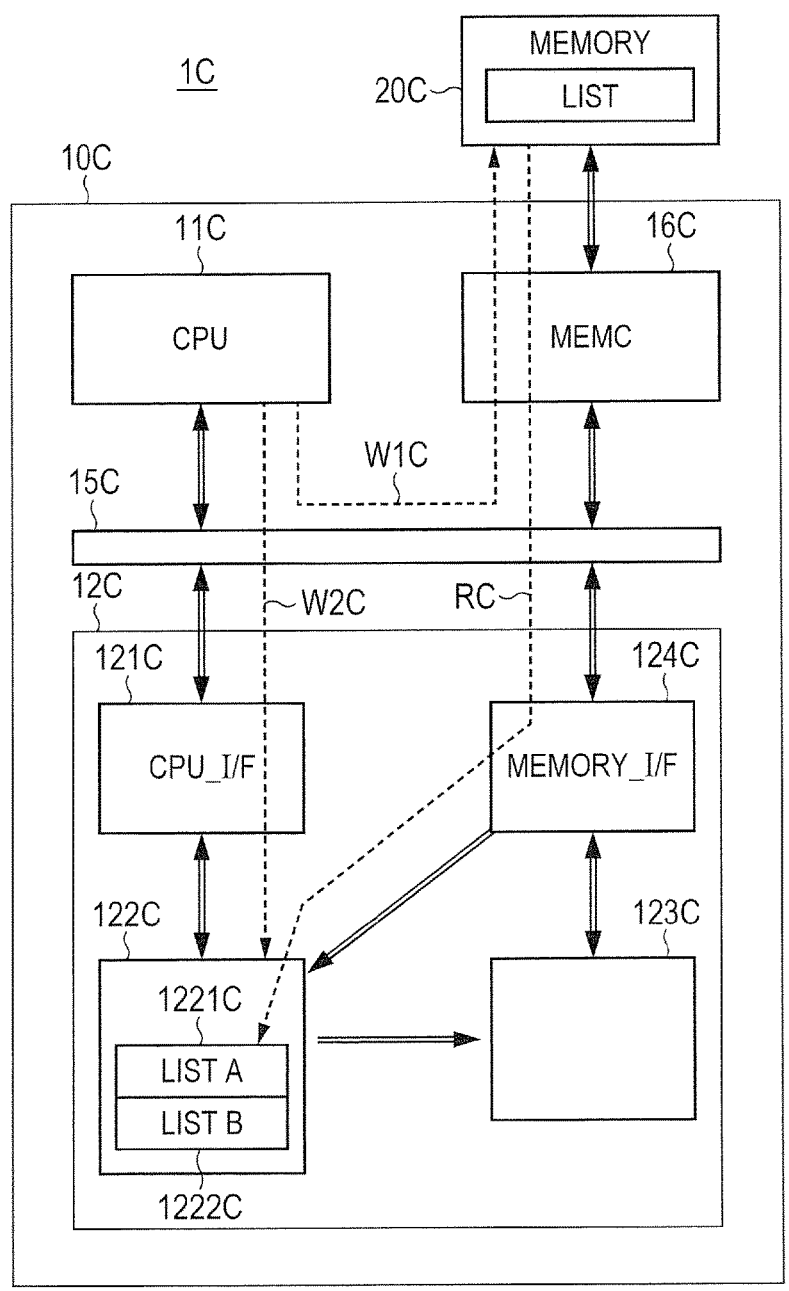
FIG. 14 is a block diagram for use in describing the structure of a system according to a third embodiment.

FIG. 14 is a block diagram showing the structure of a system according to a third embodiment. The system 1C includes a SoC 10C and a memory (MEMORY) 20C such as SDRAM. The SoC 10C is a semiconductor device formed on one semiconductor substrate. The memory 20C is a semiconductor device formed on one semiconductor substrate. The memory 20C may be formed by a plurality of semiconductor chips. The system 1C may be a SiP formed by sealing the SoC 10C and the memory 20C into one package, or formed by sealing them into separate packages and mounting them on one substrate. The system 1C is also referred to as a semiconductor device. The memory 20C may be a memory such as SRAM built in the SoC 10C similarly to the comparison example 2.

The SoC 10C includes a CPU 11C, an H/W_IP 12C, a memory controller (MEMC) 16C, and a bus 15C. The H/W_IP 12C performs predetermined processing (for example, video processing and sound processing) in a predetermined period (for example, 16.6 ms), similarly to the H/W_IP 12A and the predetermined processing is periodically performed in series. The H/W_IP 12C includes a CPU interface (CPU_I/F) 121C, a control circuit 122C, a processing circuit 123C, and a memory interface (MEMORY_I/F) 124C. As shown by a dashed arrow W1C, the CPU 11C writes a register setting list in the memory 20C through the bus 15C and the memory controller 16C. As shown by a dashed arrow W2C, the CPU 11C writes the access information of the register setting list within the memory 20C, into the control circuit 122C of the H/W_IP 12C through the bus 15C, similarly to the comparison example 2 (FIG. 6), as the initial setting. As shown by a dashed arrow RC, the H/W_IP 12C reads the register setting list from the memory 20C through the memory interface 124C, the bus 15C, and the memory controller 16C, into buffers 1221C and 1222C within the control circuit 122C. This is the H/W_IP control 112C. The buffers 1221C and 1222C may be not within the control circuit 122C but may be provided, for example, between the CPU interface 121C and the control circuit 122C. The control circuit 122C controls the H/W_IP 12C according to the register setting lists of the buffers 1221C and 1222C. The processing circuit 123C calculates the data (for example, the video data and the sound data) within the memory 14C read by the memory interface 124C through the bus 15C and the memory controller 16C, according to the register setting lists in the buffers 1221C and 1222C. The memory interface 124C writes the calculated data in the memory 14C through the bus 15C and the memory controller 16C. The control circuit 122C generates information notifying access start (Read start) and access complete (Read complete) as for the register setting list within the memory 20C; however, differently from the first and the second embodiments, the CPU interface 121C does not generate an access complete signal nor transmit it to the CPU 11C. The H/W_IP 12C is enabled to use several types of register setting lists and includes, for example, the buffer 1221C accommodating the list A and the buffer 1222C accommodating the list B. The contents of the register setting list depend on the processing, the register setting list in the case of the image magnification in the image processing is the same as in the comparison example 2 and further, in order to perform the next list, the contents such as continuation or not after completing the list processing, continuous method (repeating the same list or using another list), and in the case of using another list, address of the storage of the list are added.

Figure 15:
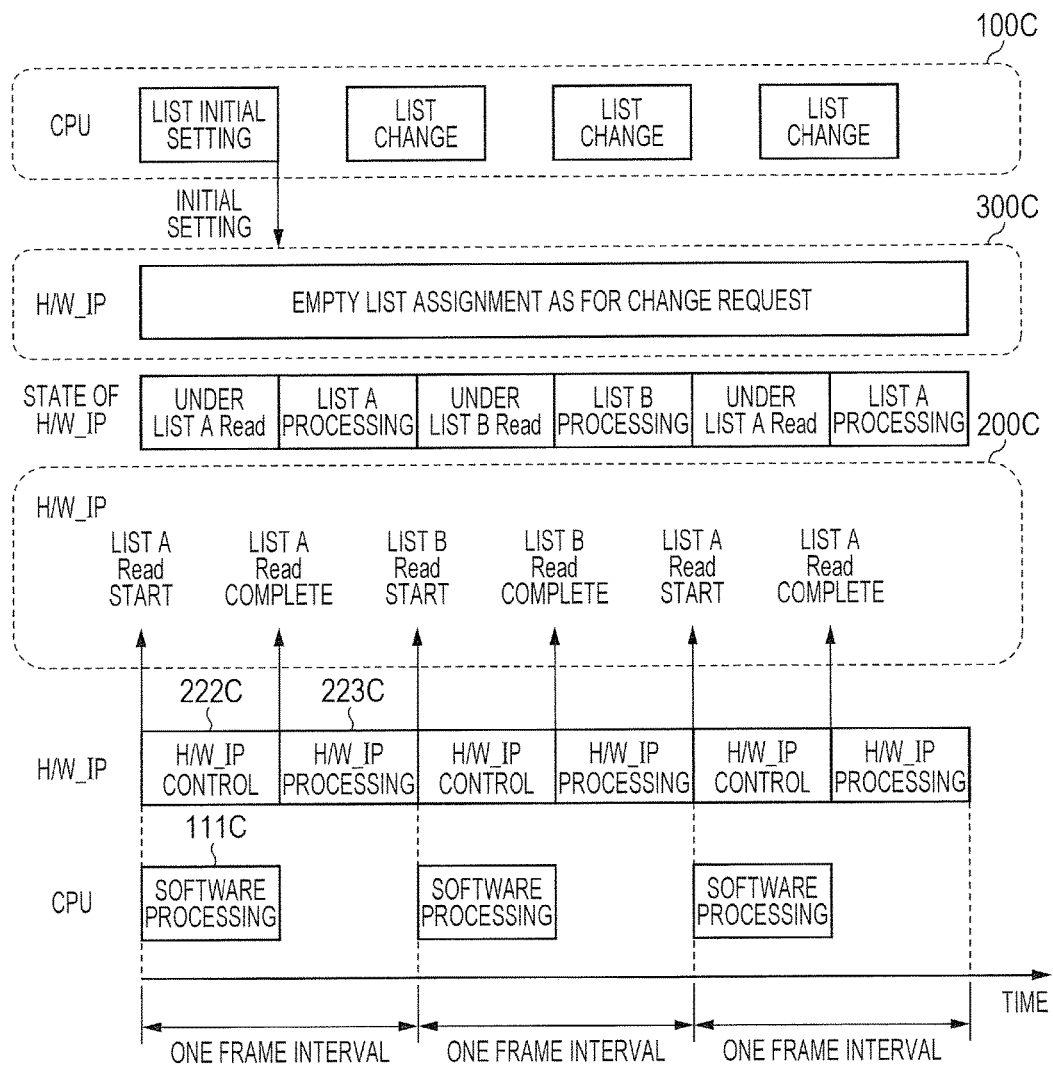
FIG. 15 is a view for use in describing a control timing in the SoC of FIG. 14.

FIG. 15 is a view showing a control timing for changing the register setting list in the SoC according to the third embodiment. The H/W_IP 12C reads the register setting list from the memory 20C (reading the list A) in the former half of one frame and performs the corresponding processing (processing the list A) in the latter half of one frame. The portion of a dashed line 100C is a CPU function (S/W_IP function) added to the comparison example 2. The portion of a dashed line 200C is an H/W_IP function added to the comparison example 2, similarly to the dashed line 200A of the first embodiment. The portion of a dashed line 300C is a buffer control function added to the first embodiment. In the portion of the dashed line 100C, in addition to the list change in the first embodiment, a change request issue to the buffer control function (empty list assignment function) is added. The CPU 11C changes the register setting list asynchronously with the H/W_IP 12C.

Figure 16:
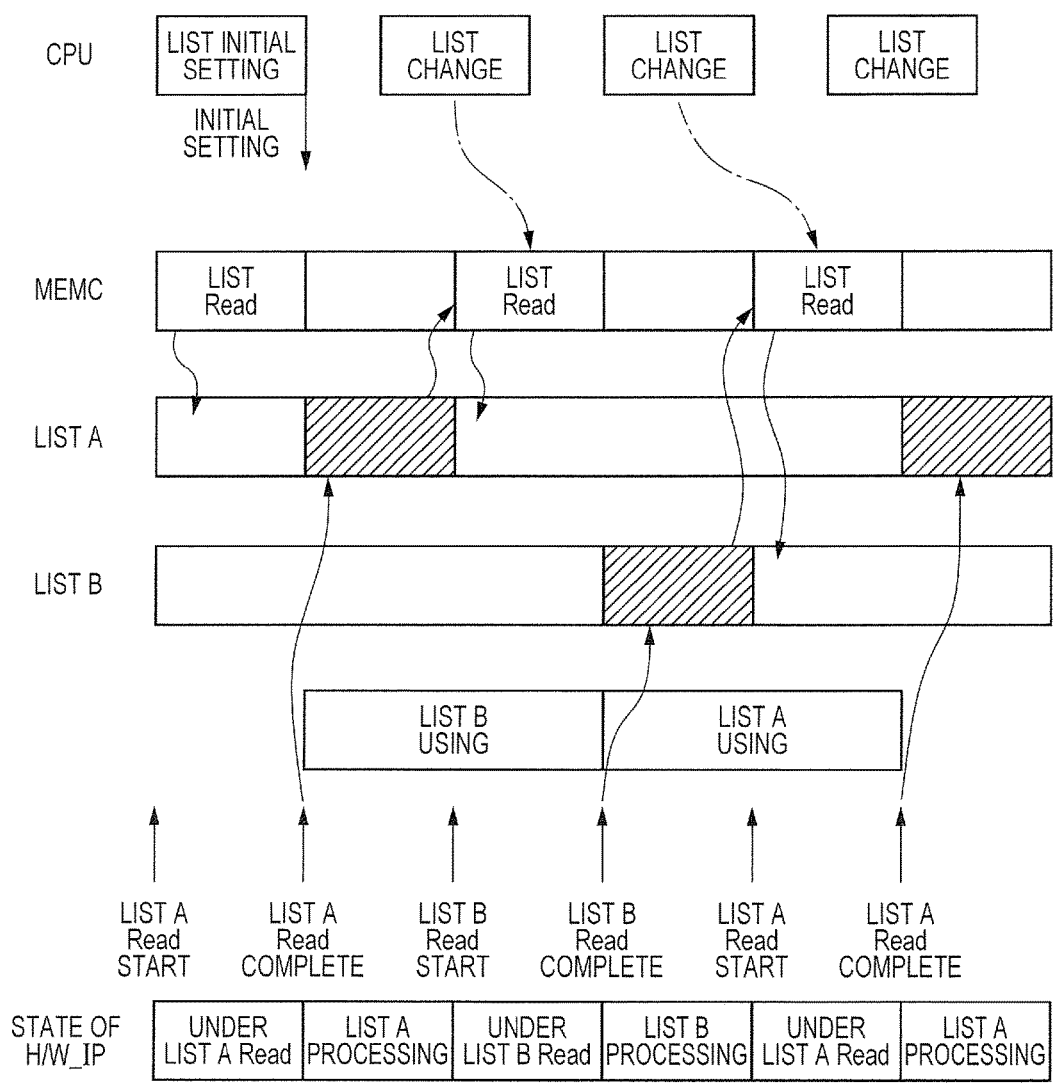
FIG. 16 is a view for use in describing a buffer control function in the SoC of FIG. 14.

FIG. 16 is a view for use in describing the buffer control function in the SoC according to the third embodiment. The empty list assignment function (buffer control function) according to the third embodiment is a function of controlling lists according to the information notifying the Read start or the Read complete in the H/W_IP 12C and the access information of the register setting lists. For example, when the Read complete of the list A is notified, it is determined that the list B is being used until the Read complete of the list B is notified. When the access request is made from the register setting list, during a period from the notification of the Read complete of the list A to the notification of the Read complete of the list B, the H/W_IP 12C writes the contents changed by the CPU 11C in the register setting lists within the memory 20C, into the list A within the buffer 1221C and switches the register setting list for use in control of the control unit 122C from the list A to the list B after the notification of the Read complete of the list B. When the Read complete of the list B is notified, it is determined that the list A is being used until the Read complete of the list A is notified. When the access request is made by the register setting list, during a period from the notification of the Read complete of the list B to the notification of the Read complete of the list A, the H/W_IP 12C writes the contents changed by the CPU 11C in the register setting lists within the memory 20C, into the list B within the buffer 1222C and switches the register setting list for use in the control of the control unit 122C from the list B to the list A after the Read complete of the list A is notified.

In the second embodiment, the CPU 11B has to issue a list update request to the H/W_IP 12B and during the processing by the buffer control function of the H/W_IP 12B, the CPU 12B has to wait for the processing of the H/W_IP 12B. In the third embodiment, however, the H/W_IP 12C updates the list in accordance with the described contents of the list not by the request from the CPU 11C, hence to make the list update timing completely asynchronous between the CPU 11C and the H/W_IP 12C. According to this, the CPU 11C does not have to wait but the H/W_IP 12C can update the list without delay. Further, by the empty list assignment function added to the H/W_IP 12C, the CPU 11C does not have to wait for the list unused period by the H/W_IP 12C. According to this, similarly to the second embodiment, the reduction of the application usable time can be improved. Further, the CPU 11C does not have to issue a list update request to the H/W_IP 12C at every time of updating a list. Accordingly, it is possible to solve a problem that the CPU has to wait for the completion of processing the request until the H/W_IP accepts the list request.

As mentioned above, although the invention made by the inventor et al. has been described specifically based on the embodiments, it is needless to say that the invention is not restricted to the above embodiments but that various modifications are possible.

What is claimed is:

1. A semiconductor device comprising a central processing unit and a processor on one semiconductor substrate, wherein the processor includes a memory interface for reading a register setting list from a memory: a processing unit for processing data based on the register setting list; a control unit for generating a start signal and a complete signal; a buffer for storing a first register setting list and notifies the central processing unit of an access complete signal indicating completion of reading a second register setting list within the memory, wherein the central processing unit changes the second register setting list within the memory based on the access complete signal and notifies the processor of an update request signal, and wherein the processor reads the second register setting list changed by the central processing unit into the buffer to update the first register setting list based on the update request information.

2. The semiconductor device according to claim 1, wherein the processor periodically performs processing for a predetermined time in series.

3. The semiconductor device according to claim 1, wherein the processor reads video data from the memory, processes the video data and writes the processed video data into the memory.

4. The semiconductor device according to claim 1, wherein the processor reads sound data from the memory, processes the sound data and writes the processed sound data into the memory.

5. The semiconductor device according to claim 1, wherein the memory is formed on a semiconductor substrate different from the above semiconductor substrate.

6. The semiconductor device according to claim 1, wherein the central processing unit changes the second register setting list within the memory based on the access complete signal while the processor continues the processing based on the first register setting list stored in the buffer.

7. A method of managing processing in a computing system comprising a central processing unit including a buffer for storing a first register setting list and a processor including a memory interface for reading a register setting list from a memory: a processing unit for processing data based on the register setting list; and a control unit for generating a start signal and a complete signal on one semiconductor substrate, the method comprising: in the processor, notifying the central processing unit of an access complete signal indicating completion of reading a second register setting list within a memory; in the central processing unit, changing the second register setting list within the memory based on the access complete signal and notifying the processor of an update request signal; and in the processor, reading the second register setting list changed by the central processing unit into the buffer to update the first register setting list based on the update request information.

8. The method of managing processing according to claim 7, wherein the processor periodically performs processing for a predetermined time in series.

9. The method of managing processing according to claim 7, wherein the processor reads video data from the memory, processes the video data and writes the processed video data into the memory.

10. The method of managing processing according to claim 7, wherein the processor reads sound data from the memory, processes the sound data and writes the processed sound data into the memory.

11. The method of managing processing according to claim 7, wherein the memory is formed on a semiconductor substrate different from the above semiconductor substrate.

12. The method of managing processing according to claim 7, wherein the central processing unit changes the second register setting list within the memory based on the access complete signal while the processor continues the processing based on the first register setting list stored in the buffer.

* * * * *